US012129385B2

(12) United States Patent
Shi

(10) Patent No.: US 12,129,385 B2
(45) Date of Patent: Oct. 29, 2024

(54) ALCOHOL SOLUBLE PRINTING INK COMPOSITIONS

(71) Applicant: Eastman Chemical (China) Co., Ltd., Shanghai (CN)

(72) Inventor: Jian Qui Jerry Shi, Shanghai (CN)

(73) Assignee: Eastman Chemical (China) Co., Ltd.

( * ) Notice: Subject to any disclaimer, the term of this patent is extended or adjusted under 35 U.S.C. 154(b) by 1039 days.

(21) Appl. No.: 17/042,253

(22) PCT Filed: Apr. 24, 2018

(86) PCT No.: PCT/CN2018/084296
§ 371 (c)(1),
(2) Date: Sep. 28, 2020

(87) PCT Pub. No.: WO2019/204994
PCT Pub. Date: Oct. 31, 2019

(65) Prior Publication Data
US 2021/0047526 A1    Feb. 18, 2021

(51) Int. Cl.
| | | |
|---|---|---|
| *C09D 11/033* | (2014.01) | |
| *C09D 11/037* | (2014.01) | |
| *C09D 11/102* | (2014.01) | |
| *C08L 1/02* | (2006.01) | |
| *C08L 75/04* | (2006.01) | |

(52) U.S. Cl.
CPC .......... *C09D 11/033* (2013.01); *C09D 11/037* (2013.01); *C09D 11/102* (2013.01); *C08L 1/02* (2013.01); *C08L 75/04* (2013.01)

(58) Field of Classification Search
CPC ... C09D 11/033; C09D 11/037; C09D 11/102; C09D 11/08; C09D 11/14; C08L 1/02; C08L 75/04
See application file for complete search history.

(56) References Cited

U.S. PATENT DOCUMENTS

| | | |
|---|---|---|
| 4,207,577 A | 6/1980 | Mansukhani |
| 4,451,597 A | 5/1984 | Victorius |
| 4,460,721 A | 7/1984 | Elser et al. |
| 6,761,969 B2 | 7/2004 | Li et al. |
| 8,003,715 B2 | 8/2011 | Shelton et al. |

(Continued)

FOREIGN PATENT DOCUMENTS

| | | |
|---|---|---|
| CN | 1820028 A | 8/2006 |
| CN | 103613990 A | 3/2014 |

(Continued)

OTHER PUBLICATIONS

Shams et al. "Developments in printing ink formulations" Pigment and Resin Technology, 1992, pp. 4-8.

(Continued)

*Primary Examiner* — Sophie Hon
(74) *Attorney, Agent, or Firm* — Judith C. Rawls

(57) ABSTRACT

Disclosed herein are ink formulations that result in improved pigment dispersion and anti-blocking in alcohol soluble inks. The ink compositions include at least one colorant; a binder comprising polyurethane; a solvent system comprising at least about 50% by weight of an alcohol, based on the total weight of the solvent system; and a cellulose ester selected from cellulose acetate propionate and cellulose acetate butyrate.

14 Claims, 2 Drawing Sheets

(56) References Cited

U.S. PATENT DOCUMENTS

| | | |
|---|---|---|
| 2004/0180993 A1 | 9/2004 | Shelton et al. |
| 2010/0247876 A1 | 9/2010 | Omino et al. |
| 2015/0197649 A1* | 7/2015 | Oya .................. D21H 19/42 427/256 |
| 2020/0195411 A1 | 6/2020 | Mariam et al. |

FOREIGN PATENT DOCUMENTS

| | | | | |
|---|---|---|---|---|
| CN | 104411782 A | | 3/2015 | |
| CN | 107177236 A | | 9/2017 | |
| CN | 112004895 B | * | 10/2022 | ........... C09D 11/033 |
| JP | H 6100817 A | | 4/1994 | |
| JP | 2009 249388 A | | 10/2009 | |
| JP | 2014 062138 A | | 4/2014 | |
| WO | WO 2005/113692 | | 5/2005 | |

OTHER PUBLICATIONS

Notification of Transmittal of the International Search Report and the Written Opinion of the International Searching Authority with Date of Mailing Jan. 14, 2019 for International Application No. PCT/CN2018/084296.

European Search Report for Application No. 18915977.5 dated Oct. 29, 2021.

* cited by examiner

ALCOHOL SOLUBLE PRINTING INK COMPOSITIONS

CROSS-REFERENCE TO RELATED APPLICATION(S)

This application is a national stage filing under 35 USC § 371 of International Application Number PCT/CN2018/084296, filed on, Apr. 24, 2018, the entire disclosure of which is incorporated by reference herein.

BACKGROUND

In recent years, more environmental and safety regulations have led to a need for inks that are less toxic, less odiferous, have fewer volatile organic compounds therein and are more cost efficient and adaptable to various types of printing. Alcohol soluble inks that have an alcohol water solvent system and/or an alcohol/ester co-solvent system have been looked at for use as printable ink on flexible packages, shrink labels, papers, cartons, etc.

However, there remain technical barriers with some alcohol soluble inks. For example, with many alcohol soluble inks there is no suitable level of pigment dispersion or anti-blocking because commonly used binders such as TPU (thermoplastic polyurethane) and/or TPA (thermoplastic polyacrylic) do not exhibit good dispersing and anti-blocking performance because they are optimized for other functions such as adhesion or bonding. These inks tend to have lower gloss, lower color strength, higher viscosity, more thixotropic rheology, more settling and more blocking. Additionally, some common inks are formulated with acrylic resin which are generally only applicable for white ink, not for colored ink.

Thus there remains a need for ink compositions that utilize TPU and/or TPA binders and which can offer excellent pigment dispersing and anti-blocking performance in alcohol based solvent systems. In other ink systems such improvements have been accomplished through the inclusion of high molecular weight cellulose alkylates. However, such cellulose alkylates were not compatible with the alcohol/water solvent blends required in current ink systems.

SUMMARY OF INVENTION

An alcohol-soluble, printing ink composition is described herein. The ink compositions includes at least one colorant; a binder comprising polyurethane; a solvent system comprising at least about 50% by weight of an alcohol, based on the total weight of the solvent system; and a cellulose alkylate selected from cellulose acetate propionate (CAP), cellulose acetate butyrate (CAB), cellulose acetate propionate butyrate (CAPB), or mixtures thereof. The cellulose ester has (i) a hydroxyl group content of 5.1% to 7.1% by weight, (ii) an acetyl group content of 0.05% to about 0.65% by weight, both based on the weight of the cellulose ester, and (iii) a number-average molecular weight ($M_e$) of 7,000 to 13,000 g/mol.

The solvent system comprises a solvent that includes a mixture of at least one alcohol and water. The alcohol may be ethanol, isopropanol, methoxypropanol, ethoxypropanol, or combinations thereof and the solvent systems includes the alcohol component in weight percentages from about 50 to 90, 50 to 80, 50 to 70, and/or 50 to 60. The system may also include a co-solvent of at least one alcohol and at least one ester. The ester may be selected from ethylacetate, i-propylacetate, n-propylacetate, methoxypropylacetate, or combinations thereof.

DETAILED DESCRIPTION

Figure 1:
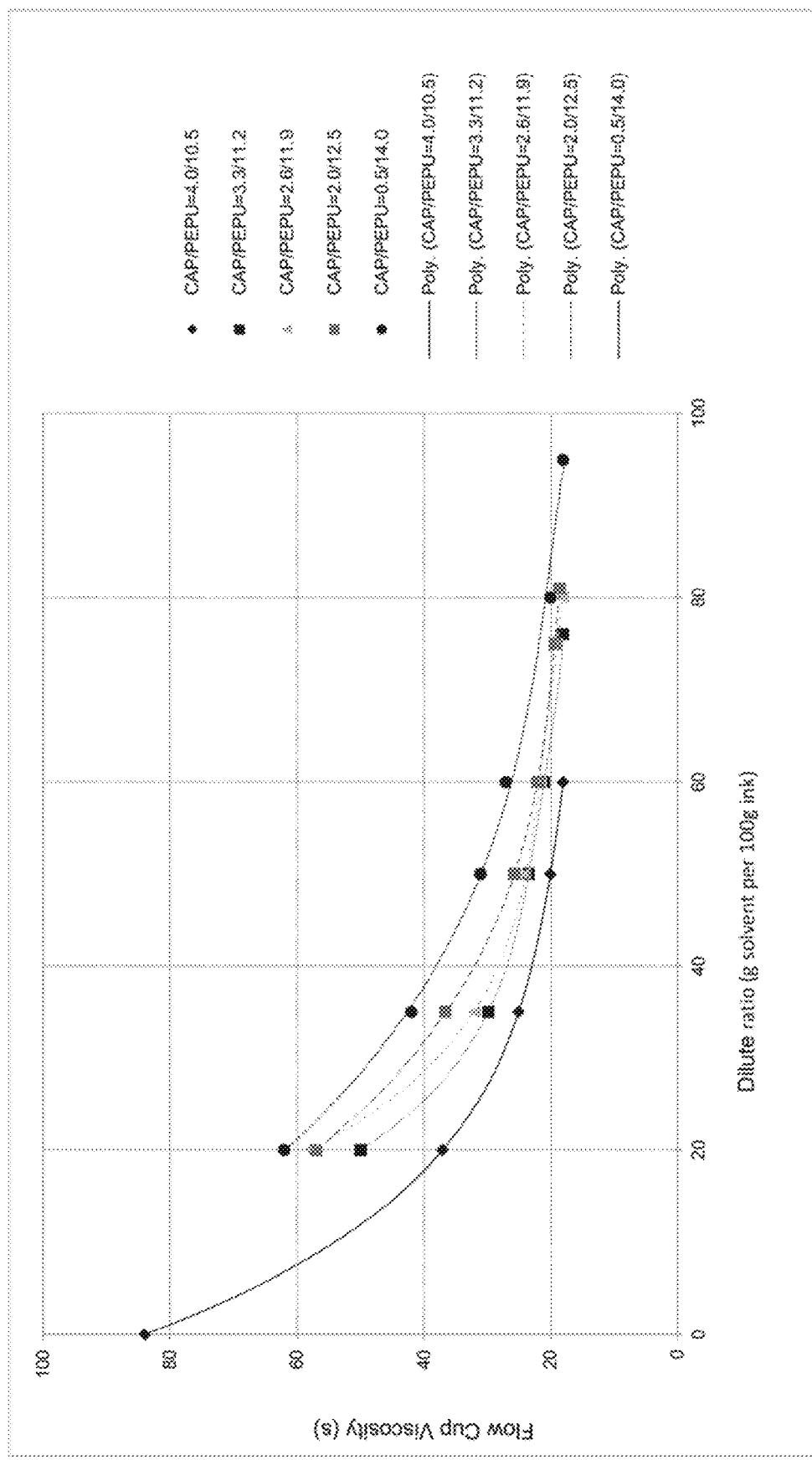
FIG. 1 illustrates the dilution curve of alcohol soluble ink with different ratio between CAP and PU.

An alcohol-soluble printing ink composition is provided. The ink compositions are advantageously optimized to have superior adhesion, anti-blocking, and dispersability performance as compared to prior art alcohol-soluble printing inks. The composition includes at least one colorant, a binder which desirably includes polyurethane, a solvent system which in some embodiments includes a solvent, a co-solvent, and/or both at that is at least about 50% be weight of alcohol based on the total weight of the solvent system. The composition also includes a cellulose alkylate which in embodiments can be a cellulose acetate propionate (CAP), cellulose acetate butyrate (CAB), cellulose acetate propionate butyrate (CAPB), or mixtures thereof. Further, the cellulose ester has a hydroxyl content from about 5.1% to about 7.1% by weight in some embodiments, and in other embodiments about 5.2% to about 7.0%, about 5.3% to about 6.9%, about 5.4% to about 6.8%, or about 5.5% to about 6.5%.

The cellulose ester has an acetyl content by weight of about 0.05% to about 0.65% by weight in some embodiments, and in other embodiments about 0.05% to about 0.60%, about 0.05% to about 0.55%, about 0.05% to about 0.50%, or about 0.05% to about 0.45%. The cellulose ester also has a number-average molecular weight ($M_n$) of about 7,000 to about 13,000 g/mol.

With regard to the colorant, any of the types of colorants typically used in inks can be used, including organic pigments, inorganic pigments, and dyes and the like. Despite the fact that the alcohol-based printing ink composition of the present invention uses an alcohol as the main component of the medium, the composition exhibits excellent pigment dispersibility, not only for inorganic pigments, but also for organic pigments.

Although not limited to the following examples, specific examples of the organic pigment include carmine 6B, lake red C, permanent red 2B, disazo yellow, pyrazolone orange, carmine FB, cromophtal yellow, cromophtal red, phthalocyanine blue, phthalocyanine green, dioxazine violet, quinacridone magenta, quinacridone red, indanthrone blue, pyrimidine yellow, thioindigo bordeaux, thioindigo magenta, perylene red, perinone orange, isoindolinone yellow, aniline black, diketopyrrolopyrrole red, and daylight fluorescent pigment.

Examples of the C.I. Pigment Numbers of organic pigments that may be used include, but are not limited to, CA. Pigment Blue 15:3, C.I. Pigment Yellow 14, C.I. Pigment Yellow 17, C.I. Pigment Yellow 83, CA. Pigment Yellow 155, C.I. Pigment Red 48:1, C.I. Pigment Red 48:2, CA. Pigment Red 48:3, C.I. Pigment Red 57:1, C.I. Pigment Red 144, C.I. Pigment Red 146, C.I. Pigment Red 166, C.I. Pigment Red 185, C.I. Pigment Red 220, C.I. Pigment Red 221, C.I. Pigment Red 242 and CA. Pigment Black 7.

Although not limited to the following examples, specific examples of the inorganic pigment include carbon back, aluminum powder, bronze powder, chrome vermilion, chrome yellow, cadmium yellow, cadmium red, ultramarine blue, Prussian blue, red iron oxide, yellow iron oxide, iron black, titanium oxide, and zinc oxide.

Although not limited to the following examples, specific examples of the dye include tartrazine lake, rhodamine 6G lake, Victoria pure blue lake, alkali blue G toner, and brilliant green lake. Further, coal tar and the like can also be used.

Among the various possibilities, in terms of the water resistance and the like, an organic pigment or an inorganic pigment is desirably used.

The colorant is included in an amount that is sufficient to ensure satisfactory color density and coloring strength for the printing ink. In other words, the colorant (E) is included in a proportion of 1 to 50% by weight in some embodiments, and in other embodiments, 5 to 40% by weight, relative to the total weight of the printing ink composition. These colorants may be used individually, or combinations of two or more colorants may be used.

With regard to the polyurethane, any type of polyurethane adapted to act as a binder while not impeding dispersement and anti-blocking performance may be utilized. One particularly useful polyurethane is a polyether polyurethane known as TA24559A-1, which is commercially available from Hitachi Chemical.

The alcohol-based printing ink composition of the present invention contains the alcohol in a proportion of at least 50% by weight relative to a value of 100% by weight for the total medium, and the composition exhibits favorable pigment dispersibility and re-solubility when the proportion of the alcohol is within a range from 50% by weight to 100% by weight.

Although not limited to the following examples, specific examples of the alcohol include aliphatic alcohols having 1 to 7 carbon atoms such as methanol, ethanol, n-propanol, isopropanol, n-butanol, isobutanol and Cert-butanol, as well as glycol monoethers such as propylene glycol monomethyl ether, propylene glycol monoethyl ether, propylene glycol monopropyl ether, propylene glycol monoisopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether and tripropylene glycol monobutyl ether.

Among the above alcohols, from the viewpoints of lowering environmental impact and ensuring a high volatilization rate, the use of ethanol and/or isopropanol is preferable. Further, the proportion of ethanol and/or isopropanol is preferably at least 70% by weight relative to a value of 100% by weight for the total alcohol (F), and it is particularly desirable that the proportion of ethanol is at least 70% by weight relative to a value of 100% by weight for the total alcohol (F). These alcohols (F) can be used individually, or a mixture containing two or more alcohols may be used.

The alcohol-based printing ink composition of the present invention may also include water as the medium, for the purpose of enhancing the dispersion stability of the pigment. The amount of water included in the medium is preferably within a range from 2 to 20% by weight, and more preferably from 2 to 10% by weight, relative to a value of 100% by weight for the total medium. When the amount of water in the medium is not more than 20% by weight, the drying rate of the medium is rapid, and the production efficiency is high in the drying process for the printing ink. When the amount of water in the medium is at least 2% by weight, the pigment dispersion stability and the storage stability are favorable.

If necessary, the alcohol-based printing ink composition of the present invention may also include a solvent other than the alcohol in the medium. Although not limited to the following solvents, specific examples of this other solvent include methoxylproponal and ethylacetate.

There are no particular limitations on the method used for producing the alcohol-based printing ink composition of the present invention, and for example the composition can be prepared by mixing the polyurethane resin, the medium and the colorant, performing a pigment dispersion treatment using a dispersion device such as a sand mill to obtain a pigment dispersion as a precursor, and then diluting this precursor to obtain the alcohol-based printing ink composition. During this milling or "grinding" process, all pigment, Cellulose Ester and part of the solvent or co-binder are blended into a millbase from 10~70% solid content, and bead-milled by shaker, vertical mill or horizontal mill. The high solid and viscosity will help the grinding efficiency. Then the millbase is blended with the rest part of solvent, co-binder and additive to produce the whole ink formulation.

The pigment dispersion treatment may be performed at a concentration that enables subsequent printing to be performed without further modification, but in terms of the pigment dispersibility, the color development properties and the production efficiency, the dispersion treatment is preferably performed under conditions where the concentration of the colorant within 100% by weight of the pigment dispersion is preferably from 10 to 70% by weight, and more preferably from 20 to 50% by weight. After performing the above pigment dispersion treatment, the dispersion may be diluted with a resin and a medium and the like to obtain a concentration that facilitates long-term storage.

In the preparation of the alcohol-based printing ink composition of the present invention, various types of additives, including pigments, wetting agents, leveling agents, anti-foaming agents, antistatic agents, anti-blocking agents, and dispersants such as vinyl chloride-vinyl acetate copolymers, may be used as required.

In particular, anti-blocking agents such as cellulose alkylates—e.g. cellulose acetate propionate (CAP) and cellulose acetate butryate (CAB)—may be used in the alcohol-based printing ink composition of the present invention.

In prior art ink compositions, high molecular weight CAP or CAB has needed to be utilized to accomplish the requisite levels of anti-blocking and solubility parameters, but were not compatible with the alcohol/water solvent system required by the present inks. Applicants in this disclosure have found an optimum composition where low molecular weight CAP or CAB can be utilized with a narrow range of acetyl and hydroxyl group compositions within the ink formulation to obtain desirable results with regard to compatibility, solubility, viscosity and rheological characteristics as well as anti-blocking properties.

EXAMPLES

Cellulose Ester Formation

Cellulose (82 g), provided as cotton linters, was activated by water, rinsed with acetic acid, and rinsed with propionic acid. A 2 L-reaction kettle was charged with the propionic acid-wet activated cellulose (162 g). Propionic acid (138 g) was added to the kettle. The mixture was cooled to 15° C. A mixture of propionic anhydride (319 g) and sulfuric acid (2.8 g) were cooled to 15° C. and then added to the reaction kettle. The mixture was stirred for 1 h at rt. The mixture was then heated to 63° C. over the course of 45 min and held for 45 min ("Hld/T"). A mixture of water (131 g) and propionic acid (371 g) was slowly added to the clear "dope." The mixture was stirred for 1250 min at 71° C. ("H/T"). The catalyst was neutralized by the addition of $Mg(OAc)_2$ (8 g) dissolved in AcOH (84 g) and water (64 g). The neutralized dope was filtered at rt through a glass wool-covered coarse fritted funnel. The product was precipitated by pouring, with rapid mixing, the clear, neutralized dope into 9 L of water. The precipitate was washed extensively with deionized water overnight. The product was dried in vacuo oven at ~60° C. overnight to yield the final product. The CAP product had a molecular weight (Mn) of 12,670. Other CAP products described herein were produced using the same general procedure.

Pigment/CE Ratio

The ink formulations of the present disclosure contain about 0~15% organic pigment, 0~6% dispersing resin and 6~20% main binder. The PU lamination ink is formulated with CE, PU and pigment wherein the CE is the main contributor to pigment dispersibility. Herein, Pigment Red 146, CE and PU are used to illustrate the performance differentiation by dosage adjustment.

The CE refers to sample CAP2-5 with 5.14% OH content and 7,610 molecular weight. The PU refers to the commercial polyether polyurethane product TA24-559A available from Hitachi Chemical. The CE and PU dosage was adjusted under fixed total resin quantity. Different proportions between CE and PU show different dilution curves and bonding strengths.

The alcohol soluble ink was formulated as shown in Table 1 below. The ink formulation was divided into millbase and letdown parts. The millbase was high concentrated pigment dispersion which contained all the pigment and CE. The high viscosity, pigment and cellulose alkylate content improved the dispersing efficiency. The dispersing was processed by mixing and bead milling with a lab vertical shaker, industrial miller or homogenizer as known in the art. Then the finished millbase was mixed with letdown by stirring to get the final ink product. The letdown part included the rest of the PU resin, solvent and additives of the ink formulation.

Formulation of the Ink for 1-1 is now explained and is applicable to all inks in Table 1 below. The millbase included 10.5 grams of Pigment Red 146, 19.8 grams of CAP2-5 solution (20% solid in Ethanol/ethylacetate=4/1), 7.2 grams of TA24-559A (33% solid in Ethanol/ethylacetate-1/2), and 10.3 grams of ethanol. 2.2 grams of ethyl acetate was filled in 250 ml fluorinated HDPE bottle and was mixed with 100 grams of ceramic beads. This was followed by 2 hours vertical shaking with Fast & Fluid SK450 mixer. Then the letdown included 24.7 grams of PU, 15.3 grams of ethanol (EA), 5.0 grams of ethylacetate (EAc) and 5 grams of methoxylpropanol (PM) was added in the bottle and followed by shaking another 0.5 hour. The finished ink product was filtered and checked by fineness gauge. The fineness was less than 15 um.

TABLE 1

Alcohol soluble ink formulation based on different CAP/PU ratio

| | Material | Ink1-1 | Ink1-2 | Ink1-3 | Ink1-4 | Ink1-5 |
|---|---|---|---|---|---|---|
| Mill base | Pigment Red 146 | 10.5 | 10.5 | 10.5 | 10.5 | 10.5 |
| | CAP2-5 solution (20% solid in EA/EAc = 4/1) | 19.8 | 16.5 | 13.2 | 9.9 | 2.6 |
| | TA24-559A(33% solid in EA/EAc = 1/2) | 7.2 | 9.2 | 11.2 | 13.3 | 17.6 |
| | EA | 10.3 | 14.1 | 15.4 | 16.6 | 19.6 |
| | EAc | 2.2 | 2.2 | 2.2 | 2.2 | 2.2 |
| Letdown | TA24-59A(33% solid in EAc/EA = 5/1) | 24.7 | 24.7 | 24.7 | 24.7 | 24.7 |
| | EA | 15.3 | 15.3 | 15.3 | 15.3 | 15.3 |
| | EAc | 5.0 | 5.0 | 5.0 | 5.0 | 5.0 |
| | PM | 5.0 | 5.0 | 5.0 | 5.0 | 5.0 |
| | Total = | 100 | 100 | 100 | 100 | 100 |
| | CE/PU = | 4.0/10.5 | 3.3/11.2 | 2.6/11.9 | 2.0/12.5 | 0.5/14.0 |

The dilution curve below shows the change of viscosity with dilution solvent added into ink. It is an important indicator for the printing process which will influence color strength and printing quality. Herein, the viscosity was checked by Sheen No. 405/2 flow cup in accordance with ASTM D4212 and D1084. Other flow cups that could be used are the Toyo cup, Nippo cup, Ford cup, Din cup, Frikmar cup, TU cup, etc. To check the ink viscosity, the flow cup was immersed in the ink, pulled out from the ink and checked how much time it will take until the continuous ink flow breaks at the hole on bottom of the flow cup. The ink was gradually diluted with ethanol/ethylacetate=4/1 cosolvent until the flow cup viscosity reached 20 seconds. The dilution curves of Ink1-1 to Ink1-5 are shown in FIG. 1.

Table: Ink dilution ratio and flow-cup viscosity versus different CAP/PU ratio

| | Ink1-1 | | Ink1-2 | | Ink1-3 | | Ink1-4 | | Ink1-5 | |
|---|---|---|---|---|---|---|---|---|---|---|
| | CAP/PEPU = 4.0/10.5 | | 3.3/11.2 | | 2.6/11.9 | | 2.0/12.5 | | 0.5/14.0 | |
| | Dilution ratio | Flow-cup viscosity | Dilution ratio | Flow-cup viscosity | Dilution ratio | Flow-cup viscosity | Dilution ratio | Flow-cup viscosity | Dilution ratio | Flow-cup viscosity |
| Dilution ratio (g solvent/100 g ink)/Flow-cup viscosity (second) | 0 | 84 | 0 | * | 0 | * | 0 | * | 0 | * |
| | 20 | 37 | 20 | 50 | 20 | 58 | 20 | 57 | 20 | 62 |
| | 35 | 25 | 35 | 30 | 35 | 32 | 35 | 37 | 35 | 42 |
| | 50 | 20 | 50 | 23 | 50 | 24 | 50 | 26 | 50 | 31 |
| | 60 | 10 | 60 | 21 | 60 | 22 | 60 | 22 | 60 | 27 |
| | | | 76 | 18 | 75 | 19 | 75 | 19 | 75 | 20 |
| | | | | | 80 | 18 | 81 | 18 | 95 | 18 |

* The ink1-2 to ink1-5 has too high ink viscosity at dilution ratio = 0 for Sheen 405/2 flow-cup.

Figure 2:
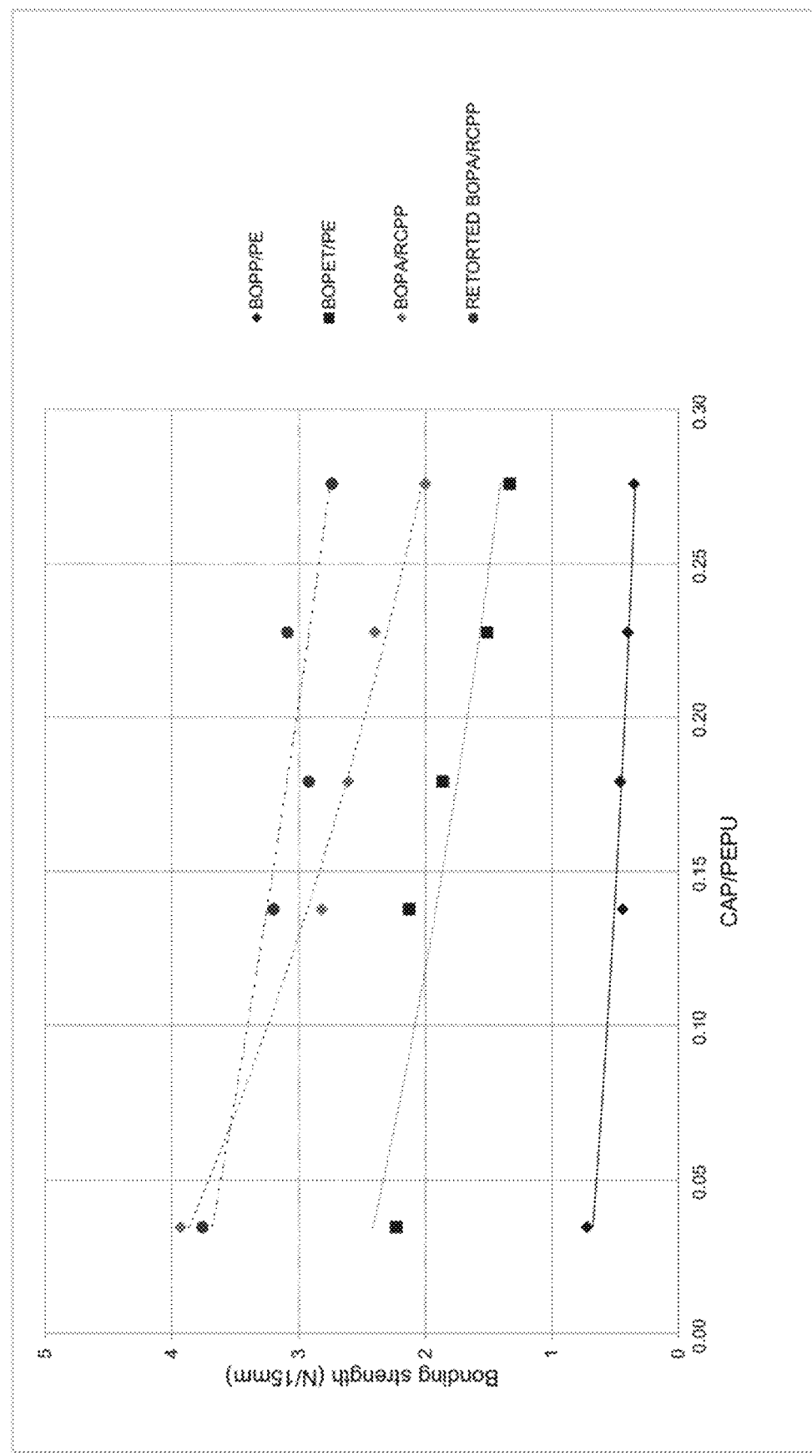
FIG. 2 illustrates the bonding strength of alcohol soluble ink with different ratio between CAP and PU

After the dilution, the ink was printed on biaxially oriented polypropylene (BOPP), biaxially oriented polyethylene (BOPET) and biaxially oriented polyamide (BOPA) film by RK proofer or online printer. Then the printed side was coated with 1.5 g/m2 solvent-born 2K PU adhesive DIC LX-500 by 2# K-bar coater, and was laminated with PE and RCPP film by a conventional roll-to-roll presser as known in the art. The 2K PU adhesive took 24 hours to cure at 40° C. The typical lamination structures are BOPP/Ink/Adhesive/PE, BOPET/Ink/Adhesive/PE and BOPA/Ink/Adhesive/RCPP. The laminated films were cut into 15 mm width strips after curing, and bonding strength was checked by peeling off PE or RCPP from BOPP, BOPET or BOPA with a tensile meter like INSTRON type 5543. The BOPA laminate has a bonding strength rechecking after retorting 30 min at 125° C. The bonding strength of Ink1-1 to Ink1-5 are shown in FIG. 2.

(BOPP=biaxial oriented polypropylene, BOPET=biaxial oriented polyester, BOPA=biaxial oriented polyamide, PE=polyethylene, RCPP=retortable casted polypropylene)

Table: Bonding strength of different lamination structure versus different CAP/PU ratio

| | Ink1-1 | Ink1-2 | Ink1-3 | Ink1-4 | Ink1-5 |
|---|---|---|---|---|---|
| | | | CAP/PU = | | |
| | 4.0/10.5 | 3.3/11.2 | 2.6/11.9 | 2.0/12.5 | 0.5/14.0 |
| BOPP/PE (N/15 mm) | 0.35 | 0.40 | 0.46 | 0.44 | 0.72 |
| PET/PE (N/15 mm) | 1.33 | 1.51 | 1.86 | 2.13 | 2.23 |
| BOPA/RCPP (N/15 mm) | 2.00 | 2.40 | 2.61 | 2.82 | 3.93 |
| BOPA/RCPP (N/15 mm) after 121° C. 30 min retort | 2.74 | 3.09 | 2.92 | 3.20 | 3.76 |

The dilution curves show that ink viscosity and dilution ratio became lower when more CAP-1 replaced PU resin. This means the cellulose alkylate has better pigment dispersibility and ink printability than PU. The bonding strength curves also show that the lamination fastness became weaker when more CAP-1 replacesPU. This means the cellulose alkylate has less adhesion than PU. Thus, the ink formulation needs to balance between pigment dispersibility and adhesion by optimizing the cellulose alkylate and PU dosage, or introducing other adhesion promoting additives. Herein, we considered the optimized range of cellulose alkylate/PU is around 0.20, and the bonding strength value can meet the request for general lamination packages like dry food, wet food and boiling food bag.

After the dilution, the ink was also printed on BOPP and BOPET to check the anti-blocking performance. The ink side is pressed onto the uncorona side with 2 kg/cm$^2$ pressure and stored at 50° C. After 24 hours, the overlapped films are peeled off by hand. The anti-blocking performance is scored from 0 to 5 based on the size of the blocked area, which are shown in Table.

Table: Anti-blocking performance versus different CAP/PU ratio

| | Ink1-1 | Ink1-2 | Ink1-3 | Ink1-4 | Ink1-5 |
|---|---|---|---|---|---|
| | | | CAP/PU = | | |
| | 4.0/10.5 | 3.3/11.2 | 2.6/11.9 | 2.0/12.5 | 0.5/14.0 |
| Anti-blocking on BOPP | 5 | 5 | 5 | 4 | 2 |
| Anti-blocking on PET | 5 | 5 | 4 | 3 | 3 |

Blocking is scored from 5 to 0, 5 = no blocked area, 0 = all blocked

The anti-blocking test shows that the lamination ink with little or no cellulose alkylate like Ink 1-5 exhibits severe blocking issue. The cellulose alkylate/PU ratio between Ink1-3 and Ink1-4 is necessary to have enough anti-blocking effect, which means cellulose alkylate/PU is between 1/4.5 to 1/6.25 for colored ink formulations.

Solubility

The new cellulose alkylate type is preferred to be high hydroxyl and low acetyl CAB or CAP, and more preferred to be CAP for low odor packaging application. The CAP can be dissolved in alcohol/ester and alcohol/water co-solvent. For packaging ink applications, such alcohol can be ethanol, isopropanol, methoxypropanol, ethoxypropanol, etc., and such ester can be ethylacetate, i-propylacetate, n-propylacetate, methoxypropylacetate, etc.

The typical high hydroxyl and low acetyl CAP has similar solubility in alcohol/ester co-solvent, but it has quite different solubility in alcohol/water co-solvent, which will be greatly influenced by its hydroxyl content.

The chemical structures of different hydroxyl content CAP from CAP2-1 to CAP2-7 are listed in Table 1. 20 grams of CAP was stirred into 80 grams of alcohol/water co-solvent to form 20% solid content solution. 4 grams of CAP was stirred into 96 grams of alcohol/water co-solvent to form 4% solid content solution. The solution was stored and observed under room temperature for 30 days. Visual observation of settling and gelation indicated insolubility. The ethanol/water and isopropanol/water solubility of these CAP samples are shown in Table 2 and 3.

| Chemical structures of CAP2-1 to CAP2-7 | | | | | |
|---|---|---|---|---|---|
| Sample No. | ELN No. | OH % | Pr % | Ac % | Mn |
| CAP2-1 | PP13-179 | 7.04% | 37.6% | 0.61% | 10,851 |
| CAP2-2 | PP14-227 | 6.02% | 41.5% | 0.12% | 12,667 |
| CAP2-3 | PP14-226 | 5.76% | 42.3% | 0.00% | 11,998 |
| CAP2-4 | PP15-220 | 5.63% | 42.3% | 0.46% | 8,569 |
| CAP2-5 | 3158-020-3 | 5.14% | 43.4% | 0.59% | 7,610 |
| CAP2-6 | Commercial CAP504-0.2 | 5.0% | 42.5% | 0.60% | 15,000 |
| CAP2-7 | Commercial CAP482-0.5 | 2.6% | 45.0% | 2.50% | 25,000 |

| Solubility of CAP in 20% solid alcohol/water solution | | | | | | | | | |
|---|---|---|---|---|---|---|---|---|---|
| | | ethanol:water = | | | | isopropanol:water = | | | |
| 20% solid | OH % | 80:0 | 75:5 | 70:10 | 60:20 | 80:0 | 75:5 | 70:10 | 60:20 |
| CAP2-1 | 7.04% | X | X | X | X | X | X | Y | X |
| CAP2-2 | 6.02% | X | X | Y | X | X | X | Y | Y |
| CAP2-3 | 5.76% | X | X | Y | X | X | X | Y | Y |
| CAP2-4 | 5.63% | X | X | Y | X | X | X | Y | Y |
| CAP2-5 | 5.14% | X | X | X | X | X | X | Y | X |
| CAP2-6 | 5.0% | X | X | X | X | X | X | Y | X |
| CAP2-7 | 2.6% | X | X | X | X | X | X | X | X |

| Solubility of CAP in 4% solid alcohol/water solution | | | | | | | | | |
|---|---|---|---|---|---|---|---|---|---|
| | | ethanol:water = | | | | isopropanol:water = | | | |
| 4% solid | OH % | 90:10 | 80:20 | 70:30 | 60:40 | 90:10 | 80:20 | 70:30 | 60:40 |
| CAP2-1 | 7.04% | X | X | X | X | X | Y | X | X |
| CAP2-2 | 6.02% | X | Y | X | X | X | Y | Y | X |
| CAP2-3 | 5.76% | X | Y | X | X | X | Y | Y | X |
| CAP2-4 | 5.63% | X | Y | X | X | X | Y | Y | X |
| CAP2-5 | 5.14% | X | X | X | X | X | Y | X | X |
| CAP2-6 | 5.0% | X | X | X | X | X | Y | X | X |
| CAP2-7 | 2.6% | X | X | X | X | X | X | X | X |

The solubility tables show: (1) Different hydroxyl content has influence on the alcohol/water solubility, the optimized hydroxyl range is between CAP2-2 and CAP2-4, (2) Isopropanol/water has wider solubility than ethanol/water, (3) Lower solid solution will need a little more water in the co-solvent compared with the higher solid solution.

Compatibility

The new CE type meets the compatibility required in actual ink application. The high hydroxyl and low acetyl CAB or CAP is formulated with polyurethane, acrylic, rosin resins and plasticizers, etc. Thus, the compatibility is checked between CAP and alcohol soluble polyurethane by blending CAP solution/PU solution/ethanol in 1/1/2 proportion. Herein, the CAP solution refers to the 20% solid solution in ethanol/water=7/1 solvent, and PU solution refers to the offering status with 33% solid. The mixture was stored and observed under room temperature for 30 days. Visual observation of settling and layering indicated incompatibility.

The CAP2-1 to CAP2-7 were checked for compatibility with the selected PU samples. The results are shown below

| PU candidates for compatibility test | | |
|---|---|---|
| Commercial name | Producer | Rough structure |
| Neorez U-335 | DSM | Aromatic |
| TA24-559A | Hitachi Chemical | Non-aromatic |
| Wancol 913 | Wanhua | Non-aromatic |
| Picassian PU-548 | Stahl | Aromatic, low molecule |

| Compatibility between CAP and commercial alcohol soluble PU | | | | | |
|---|---|---|---|---|---|
| | OH % | U-335 | 559A | 913 | 548 |
| CAP2-1 | 7.04% | X | X | X | X |
| CAP2-2 | 6.02% | X | Y | Y | Y |
| CAP2-3 | 5.76% | X | Y | Y | Y |
| CAP2-4 | 5.63% | X | Y | Y | Y |
| CAP2-5 | 5.14% | X | Y | Y | Y |

-continued

Compatibility between CAP and commercial alcohol soluble PU

|  | OH % | U-335 | 559A | 913 | 548 |
|---|---|---|---|---|---|
| CAP2-6 | 5.0% | X | Y | Y | Y |
| CAP2-7 | 2.6% | X | Y | Y | Y |

The compatibility test shows: (1) The aromatic type PU is usually not compatible with CAP, (2) Some non-aromatic type PU can be compatible with CAP, depending on the polyol part of PU like TA24-559A and Wancol 913, (3) Some low molecular weight aromatic PU, which is designed as plasticizer, can be compatible with CAP. This type of compatible combination can be applied in surface printing ink formulation, (4) The hydroxyl content of CAP should be optimized below 7% for good compatibility.

Pigment Dispersibility

The CAP powder and NC wool were dissolved into 20% solid content solution in advance. 20 grams of CAP, 10 grams of ethylacetate and 70 grams of isopropanol were mixed into CAP solution by stirrer or vertical shaker. 28.6 grams of NC wool (with 30% isopropanol as humectant), 10 grams of ethylacetate and 61.4 grams of isopropanol were mixed into NC solution by stirrer or vertical shaker.

The ink was processed in the same method as the ink described above. The ink formulation was divided into millbase and letdown parts. The millbase was first bead-milled, and then was blended with letdown. The color saturation and dilution ratio were introduced to evaluate the pigment dispersibility of the ink formulation.

The color saturation represented the color strength, and was positively related to pigment dispersibility. The ink was printed on standard Leneta P-300 carton by K printing proofer 81943-1 gravure plate or #2 K-bar coater, and then color saturation was checked by colorimeter with CIE's LCH method. Such colorimeter can be X-rite eXact and Sheen Micromatch Plus.

The dilution ratio represents the rheology quality, and is negatively related to pigment dispersibility. The ink is stepwise diluted by solvent, and checked by viscosity cup.

The ink formulation, color saturation and dilution ratio values are shown below.

Alcohol soluble ink formulation based on CAP/PU and NC/PU

|  | Material | Ink2-1 | Ink2-2 | Ink2-3 |
|---|---|---|---|---|
| Mill base | Pigment Red 146 | 10.5 | 10.5 | 10.5 |
|  | SS1/8 NC solution (20% solid in IPA/EAc = 7/1) | 17.5 | — | — |
|  | CAP2-5 solution (20% solid in IPA/water = 7/1) | — | 17.5 | — |
|  | CAP2-2 solution (20% solid in IPA/water = 7/1) | — | — | 17.5 |
|  | TA24-559A (33% solid in EA/EAc = 1/2) | 9.0 | 9.0 | 9.0 |
|  | IPA | 13.0 | 9.0 | 9.0 |
|  | water | — | 4.0 | 4.0 |
| Letdown | TA24-559A (33% solid in EA/EAc = 1/2) | 26.0 | 26.0 | 26.0 |
|  | IPA | 19.0 | 16.5 | 16.5 |
|  | PM | 5.0 | 5.0 | 5.0 |
|  | water | — | 2.5 | 2.5 |
|  | Total = | 100 | 100 | 100 |
|  | Before storage |  |  |  |
|  | Color saturation (CIE LCH method) | 68.18 | 69.66 | 71.25 |
|  | After storage (45° C., 7 days) |  |  |  |
|  | Color saturation (CIE LCH method) | 69.34 | 70.73 | 72.29 |
|  | Dilution ratio (g solvent/100 g ink) (dilute to 18 sec, Zahn2# cup) | 97 g (with IPA/EAc = 8/2) | 70 g (with IPA/water = 9/1) | 79 g (with IPA/water = 9/1) |

From the color saturation and dilution ratio, we can find:
(1) CAP has obvious higher color saturation and lower dilution ratio than NC in the alcohol based lamination ink, which can help to print more vivid image or reduce ink consumption.
(2) Higher hydroxyl content CAP2-2 has higher color saturation than CAP2-5, which means the pigment dispersibility can be improved by higher hydroxyl content.

In the above test, CAP was found to have better color strength and dilution performance in the alcohol based ink versus traditional NC+PU system.

The invention claimed is:
1. An alcohol-soluble, printing ink composition comprising:
    (a) at least one colorant;
    (b) a binder comprising an alcohol-soluble polyurethane;
    (c) a solvent system comprising at least about 50% by weight of an alcohol based on the total weight of the solvent system,
    wherein the solvent system comprises a solvent comprising a mixture of at least one alcohol and water; and
    (d) a cellulose alkylate selected from the group consisting of cellulose acetate propionate and cellulose acetate butyrate, wherein the cellulose alkylate/alcohol-soluble polyurethane weight ratio is between 1/4.5 to 1/6.25, wherein the cellulose alkylate has (i) a hydroxyl group content of 5.1% to 7.1% by weight, (ii) an acetyl group content of 0.05% to about 0.65% by weight, both based on the weight of the cellulose alkylate, and (iii) a number-average molecular weight (Mn) of 7,000 to 13,000 g/mol, and wherein the alcohol-soluble, printing ink composition has a color saturation CIE as determined by LCH method, which is higher than that of an alcohol-soluble, printing ink composition which has the same composition except for the cellulose alkylate having been replaced by nitrocellulose (NC).

2. The composition of claim 1 wherein the at least one alcohol is ethanol.

3. The composition of claim 1 wherein the at least one alcohol is isopropanol.

4. The composition of claim 1, wherein the at least one alcohol is selected from ethanol, isopropanol, methoxypropanol, ethoxypropanol, and combinations thereof.

5. The composition of claim 1, wherein the solvent system comprises 50 to about 90% by weight of alcohol.

6. The composition of claim 1, wherein the solvent system comprises 50 to about 80% by weight of alcohol.

7. The composition of claim 1, wherein the solvent system comprises 50 to about 70% by weight of alcohol.

8. The composition of claim 1, wherein the solvent system comprises 50 to about 60% by weight of alcohol.

9. The composition of claim 1, wherein the solvent system further comprises a co-solvent.

10. The composition of claim 9, wherein the co-solvent comprises at least one other alcohol, at least one ester, or a mixture thereof.

11. The composition of claim 10, wherein the at least one other alcohol is ethanol.

12. The composition of claim 10 wherein the at least one other alcohol is isopropanol.

13. The composition of claim 10, wherein the at least one other alcohol is selected from ethanol, isopropanol, methoxypropanol, ethoxypropanol, and combinations thereof.

14. The composition of claim 10, wherein the at least one ester is ethylacetate, i-propylacetate, n-propylacetate, methoxypropylacetate, or combinations thereof.

* * * * *